(12) United States Patent
Hanna et al.

(10) Patent No.: US 7,594,568 B2
(45) Date of Patent: Sep. 29, 2009

(54) ROTOR ASSEMBLY AND METHOD

(75) Inventors: Michael D. Hanna, West Bloomfield, MI (US); Richard M. Kleber, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/440,893

(22) Filed: May 25, 2006

(65) Prior Publication Data

US 2007/0119667 A1   May 31, 2007

Related U.S. Application Data

(60) Provisional application No. 60/740,882, filed on Nov. 30, 2005.

(51) Int. Cl.
*F16D 65/12* (2006.01)
(52) U.S. Cl. .................................. 188/218 XL
(58) Field of Classification Search ........... 188/218 XL, 188/218 R, 18 A
See application file for complete search history.

(56) References Cited

U.S. PATENT DOCUMENTS

| | | | |
|---|---|---|---|
| 1,989,211 A | | 1/1935 | Norton |
| 2,603,316 A | * | 7/1952 | Pierce ................. 188/218 XL |
| 3,085,391 A | | 4/1963 | Hatfield et al. |
| 3,147,828 A | | 9/1964 | Hunsaker |
| 3,292,746 A | | 12/1966 | Robinette |
| 3,378,115 A | | 4/1968 | Stephens, III |
| 3,425,523 A | | 2/1969 | Robinette |
| 3,509,973 A | | 5/1970 | Kimata |
| 3,575,270 A | | 4/1971 | Reinbek et al. |
| 3,774,472 A | | 11/1973 | Mitchell |
| 3,841,448 A | | 10/1974 | Norton, Jr. |
| 3,975,894 A | | 8/1976 | Suzuki |
| 4,049,085 A | * | 9/1977 | Blunier ................. 188/218 XL |
| 4,072,219 A | | 2/1978 | Hahm et al. |

(Continued)

FOREIGN PATENT DOCUMENTS

DE     24 46 938     4/1976

(Continued)

OTHER PUBLICATIONS

International Search Report dated Apr. 2, 2007 for International Application No. PCT US06/29687, Publication No. WO 2007/040768; GM Global Technology Operations, Inc.

(Continued)

*Primary Examiner*—Bradley T King

(57) ABSTRACT

The apparatus of the present invention provides a brake rotor assembly. The brake rotor assembly includes a generally annular rotor having a frictional surface and a radially inner rotor flange defining a plurality of rotor teeth. The brake rotor assembly also includes a hub section integrally formed onto the rotor. The hub section has a peripheral hub flange configured to engage the plurality of rotor teeth and thereby prevent rotation of the hub section relative to the rotor. The rotor is preferably composed of a first material such as steel or cast iron, and the hub section is preferably composed of a second material such as aluminum or magnesium that is lighter by volume than the first material. Accordingly, the overall weight of the rotor assembly is less than that of a comparable rotor assembly composed entirely of steel or cast iron.

12 Claims, 2 Drawing Sheets

U.S. PATENT DOCUMENTS

| | | | |
|---|---|---|---|
| 4,250,950 | A | 2/1981 | Buxmann et al. |
| 4,379,501 | A | 4/1983 | Hagiwara et al. |
| 4,475,634 | A | 10/1984 | Flaim et al. |
| 4,523,666 | A | 6/1985 | Murray |
| 4,905,299 | A | 2/1990 | Ferraiuolo et al. |
| 5,004,078 | A | 4/1991 | Oono et al. |
| 5,025,547 | A | 6/1991 | Sheu et al. |
| 5,083,643 | A | 1/1992 | Hummel et al. |
| 5,115,891 | A | 5/1992 | Raitzer et al. |
| 5,139,117 | A | 8/1992 | Melinat |
| 5,143,184 | A | 9/1992 | Snyder et al. |
| 5,183,632 | A | 2/1993 | Kiuchi et al. ............... 419/48 |
| 5,259,486 | A | 11/1993 | Deane |
| 5,310,025 | A | 5/1994 | Anderson |
| 5,416,962 | A | 5/1995 | Passarella |
| 5,417,313 | A | 5/1995 | Matsuzaki et al. |
| 5,509,510 | A | 4/1996 | Ihm |
| 5,530,213 | A | 6/1996 | Hartsock et al. |
| 5,582,231 | A | 12/1996 | Siak et al. |
| 5,620,042 | A * | 4/1997 | Ihm ............................ 164/95 |
| 5,660,251 | A | 8/1997 | Nishizawa et al. |
| 5,789,066 | A | 8/1998 | DeMare et al. |
| 5,819,882 | A | 10/1998 | Reynolds et al. |
| 5,855,257 | A | 1/1999 | Wickert et al. |
| 5,862,892 | A * | 1/1999 | Conley ................. 188/218 XL |
| 5,878,843 | A | 3/1999 | Saum |
| 5,927,447 | A | 7/1999 | Dickerson |
| 6,047,794 | A | 4/2000 | Nishizawa |
| 6,073,735 | A * | 6/2000 | Botsch et al. ......... 188/218 XL |
| 6,206,150 | B1 | 3/2001 | Hill |
| 6,216,827 | B1 | 4/2001 | Ichiba et al. |
| 6,223,866 | B1 | 5/2001 | Giacomazza |
| 6,241,055 | B1 | 6/2001 | Daudi |
| 6,241,056 | B1 | 6/2001 | Cullen et al. |
| 6,283,258 | B1 | 9/2001 | Chen et al. |
| 6,302,246 | B1 | 10/2001 | Naumann et al. |
| 6,357,557 | B1 * | 3/2002 | Di Ponio .............. 188/218 XL |
| 6,405,839 | B1 | 6/2002 | Ballinger et al. |
| 6,465,110 | B1 | 10/2002 | Boss et al. |
| 6,481,545 | B1 | 11/2002 | Yano et al. |
| 6,505,716 | B1 | 1/2003 | Daudi et al. |
| 6,507,716 | B2 | 1/2003 | Nomura et al. |
| 6,543,518 | B1 | 4/2003 | Bend et al. |
| 6,799,664 | B1 * | 10/2004 | Connolly .................... 188/337 |
| 6,880,681 | B2 | 4/2005 | Koizumi et al. |
| 6,890,218 | B2 | 5/2005 | Patwardhan et al. |
| 6,899,158 | B2 | 5/2005 | Matuura et al. |
| 6,932,917 | B2 | 8/2005 | Golden et al. |
| 7,066,235 | B2 | 6/2006 | Huang |
| 2002/0084156 | A1 | 7/2002 | Ballinger et al. |
| 2002/0104721 | A1* | 8/2002 | Schaus et al. ......... 188/218 XL |
| 2003/0037999 | A1 | 2/2003 | Tanaka et al. |
| 2003/0127297 | A1 | 7/2003 | Smith et al. |
| 2003/0141154 | A1 | 7/2003 | Rancourt et al. |
| 2003/0213658 | A1 | 11/2003 | Baba |
| 2004/0031581 | A1 | 2/2004 | Herreid et al. |
| 2004/0045692 | A1* | 3/2004 | Redemske ................. 164/121 |
| 2004/0074712 | A1 | 4/2004 | Quaglia et al. |
| 2004/0084260 | A1* | 5/2004 | Hoyte et al. .......... 188/218 XL |
| 2004/0242363 | A1 | 12/2004 | Kohno et al. |
| 2005/0011628 | A1 | 1/2005 | Frait et al. |
| 2005/0150222 | A1 | 7/2005 | Kalish et al. |
| 2005/0183909 | A1 | 8/2005 | Rau, III et al. |
| 2005/0193976 | A1 | 9/2005 | Suzuki et al. |
| 2006/0076200 | A1 | 4/2006 | Dessouki et al. |
| 2006/0243547 | A1* | 11/2006 | Keller .................. 188/218 XL |
| 2007/0142149 | A1 | 6/2007 | Kleber |

FOREIGN PATENT DOCUMENTS

| | | |
|---|---|---|
| DE | 25 37 038 | 3/1977 |
| DE | 199 48 009 | 3/2001 |
| DE | 101 41 698 | 3/2003 |
| EP | 0 205 713 | 12/1986 |
| GB | 1230 274 | 4/1971 |
| GB | 2328952 | 3/1999 |
| JP | 57154533 | 9/1982 |
| WO | WO 98/23877 | 6/1998 |
| WO | WO 01/36836 | 5/2001 |

OTHER PUBLICATIONS

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulomb friction damped disc brake rotors, filed Oct. 8, 2004.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No.12/183,104, Low mass multi-piece sound damped article, filed Jul. 31, 2008.

Golden et al., U.S. Appl. No. 12/105,411, Insert with filler to dampen vibrating components, filed Apr. 18, 2008.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 12/858,596, Lightweight brake rotor and components with composite materials, filed Sep. 20, 2007.

Dessouki et al., U.S. Appl. No. 12/178,872, Friction damped brake drum, filed Jul. 24, 2008.

Sachdev et al., U.S. Appl. No. 11/832,356, Friction welding method and products made using the same, filed Aug. 1, 2007.

* cited by examiner

ROTOR ASSEMBLY AND METHOD

CROSS-REFERENCE TO RELATED APPLICATIONS

This application claims priority to U.S. Provisional Patent Application No. 60/740,882 filed on Nov. 30, 2005.

TECHNICAL FIELD

The present invention pertains generally to an improved rotor assembly and method for producing a rotor assembly.

BACKGROUND OF THE INVENTION

Conventional brake rotors are typically composed of cast iron or steel and are therefore relatively heavy. Accordingly, it is known to make a brake rotor assembly composed of an outer cast iron or steel ring including the friction surface engaged by the brake pad, and an aluminum or magnesium inner disc mounted thereto in order to save weight. In the past, such a design was prohibitively expensive to manufacture and assemble and was therefore primarily used for racing applications.

SUMMARY OF THE INVENTION

The brake rotor assembly of the present invention includes a generally annular rotor having a frictional surface and a radially inner rotor flange defining a plurality of rotor teeth. The brake rotor assembly also includes a hub section integrally formed onto the rotor. The hub section has a peripheral hub flange configured to engage the plurality of rotor teeth and thereby prevent rotation of the hub section relative to the rotor. The rotor is preferably composed of a first material such as steel or cast iron, and the hub section is preferably composed of a second material such as aluminum or magnesium that is lighter by volume than the first material. Accordingly, the overall weight of the rotor assembly is less than that of a comparable rotor assembly composed entirely of steel or cast iron.

A preferred method for manufacturing the brake rotor assembly initially includes providing an upper tool having an upper sealing lip, and a lower tool having a lower sealing lip. A rotor having a radially inner rotor flange is then disposed within the lower tool. The upper and lower tools are then engaged such that a cavity is formed therebetween. According to a preferred embodiment, the upper tool, the lower tool and the rotor are heated. A compressive force is preferably applied to draw the upper and lower tools together and thereby clamp the rotor flange between the upper sealing lip and the lower sealing lip. Thereafter, material is transferred into the cavity formed between the upper and lower tools such that a hub section is formed onto the rotor.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
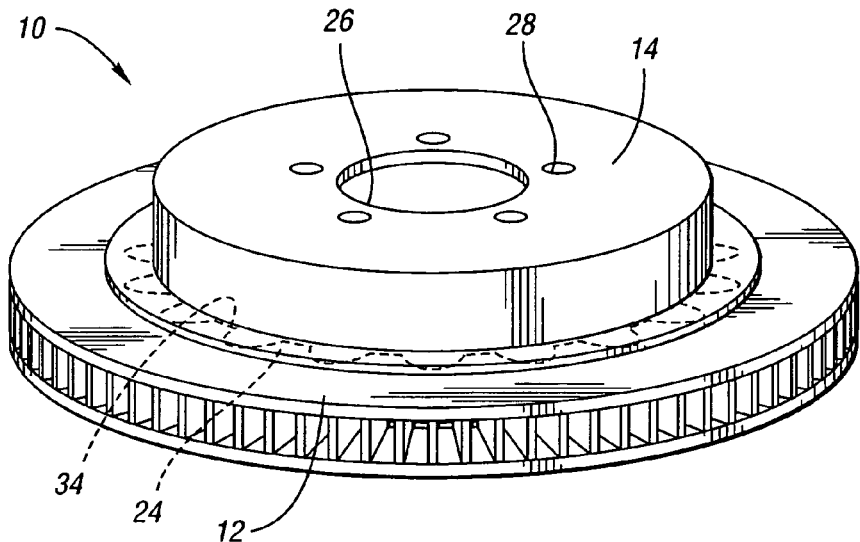
FIG. 1 is a perspective view of a rotor assembly in accordance with the present invention.

Referring to the drawings, wherein like reference numbers refer to like components, FIG. 1 shows a perspective view of a brake rotor assembly 10 in accordance with the present invention. The rotor assembly 10 includes a radially outer vented rotor 12 and a radially inner hub section 14 circumscribed by the vented rotor 12. It should be appreciated that the vented rotor 12 is shown for illustrative purposes, and that the present invention also applies to alternate rotor configurations.

Figure 2:
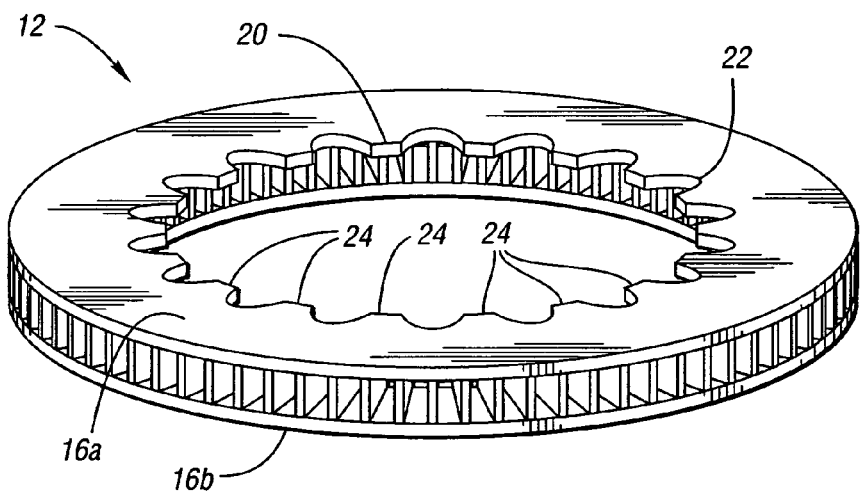
FIG. 2 is a perspective view of a rotor of the rotor assembly of FIG. 1.

Referring to FIG. 2, the vented rotor 12 is shown in more detail. The vented rotor 12 includes opposing frictional surfaces or cheeks 16a, 16b adapted for engagement by a brake pad (not shown). The rotor 12 has a radially internal rotor flange 20 with an edge 22 having a plurality of rotor teeth 24. The rotor teeth 24 are adapted to engage complementary hub teeth 34 (shown in FIGS. 1 and 3) on the hub section 14 and thereby resist rotation of the rotor 12 relative to the hub section 14.

Heat is generated as a brake pad (not shown) engages the vented rotor 12, and the vented rotor 12 is therefore prone to thermal deformation. Accordingly, the vented rotor 12 is typically composed of steel or cast iron as such materials provide good resistance to thermal deformation, resist wear during engagement by the brake pad, and are relatively inexpensive. It is well known; however, that steel and cast iron are relatively heavy materials and a conventional rotor assembly made exclusively of steel or cast iron is correspondingly heavy.

Figure 3:
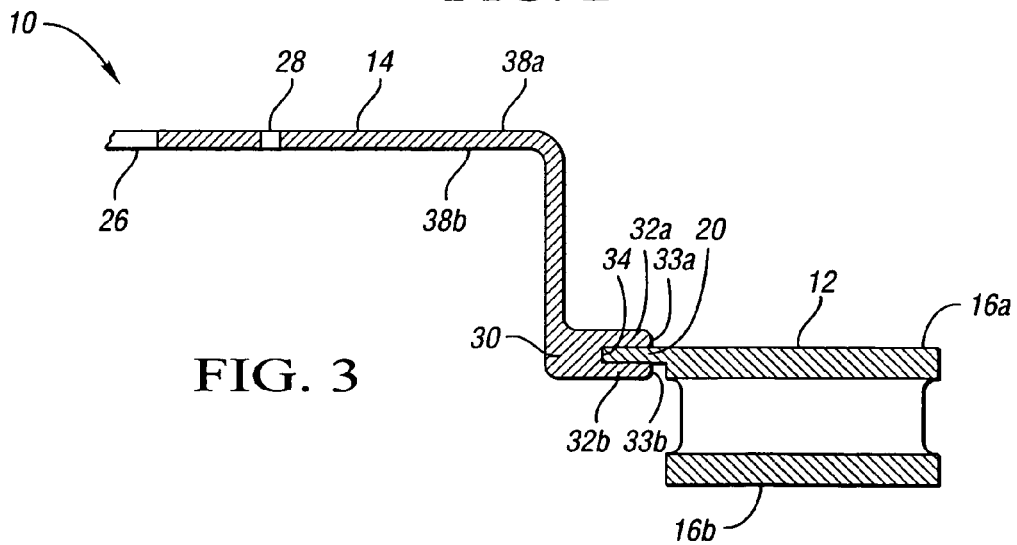
FIG. 3 is a partial sectional view of the rotor assembly of FIG. 1.

Referring to FIG. 3, a partial cross-sectional view of the rotor assembly 10 is shown. The hub section 14 preferably defines a central aperture 26 and a plurality of bolt holes 28 to facilitate the attachment of the rotor assembly 10 onto a vehicle. The hub section 14 has a top surface 38a, and a generally opposite bottom surface 38b. The hub section 14 includes a peripheral hub flange 30 adapted to engage the rotor flange 20. The hub flange 30 includes a top portion 32a and a bottom portion 32b that are configured to trap the rotor flange 20 therebetween. The top portion 32a and the bottom portion 32b respectively define radially outer terminal edges 33a and 33b. The hub flange 30 also includes a plurality of hub teeth 34 disposed between the top and bottom portions 32a, 32b. The hub teeth 34 are adapted to engage complementary rotor teeth 24 (shown in FIG. 2) of the rotor 12 and thereby resist rotation of the rotor 12 relative to the hub section 14.

The engagement of the hub flange 30 with the rotor flange 20 has been described in accordance with a preferred embodiment wherein the rotor flange 20 is trapped between opposing portions 32a, 32b of the hub flange 30. It should be appreciated; however, that according to an alternate embodiment of the present invention, the geometry of the flange 20 may be replaced with that of flange 30 and vice versa. In other words, the rotor flange 20 may include opposing portions (not shown) configured to trap the hub flange 30 therebetween.

The hub section 14 is preferably composed of aluminum, magnesium or any other lightweight material such that the rotor assembly 10 weighs less than a conventional rotor assembly composed exclusively of steel or cast iron. As an example, the density of aluminum is 2,700 kg/m³ which therefore weighs significantly less by volume than steel having a density of approximately 7,850 kg/m³. Additionally, as described hereinabove, the friction surfaces 16a, 16b of the rotor assembly 10 which are engaged by a brake pad (not shown) are preferably composed of steel or cast iron such that the rotor assembly 10 performs as well as a conventional rotor assembly composed exclusively of steel or cast iron.

Figure 4:
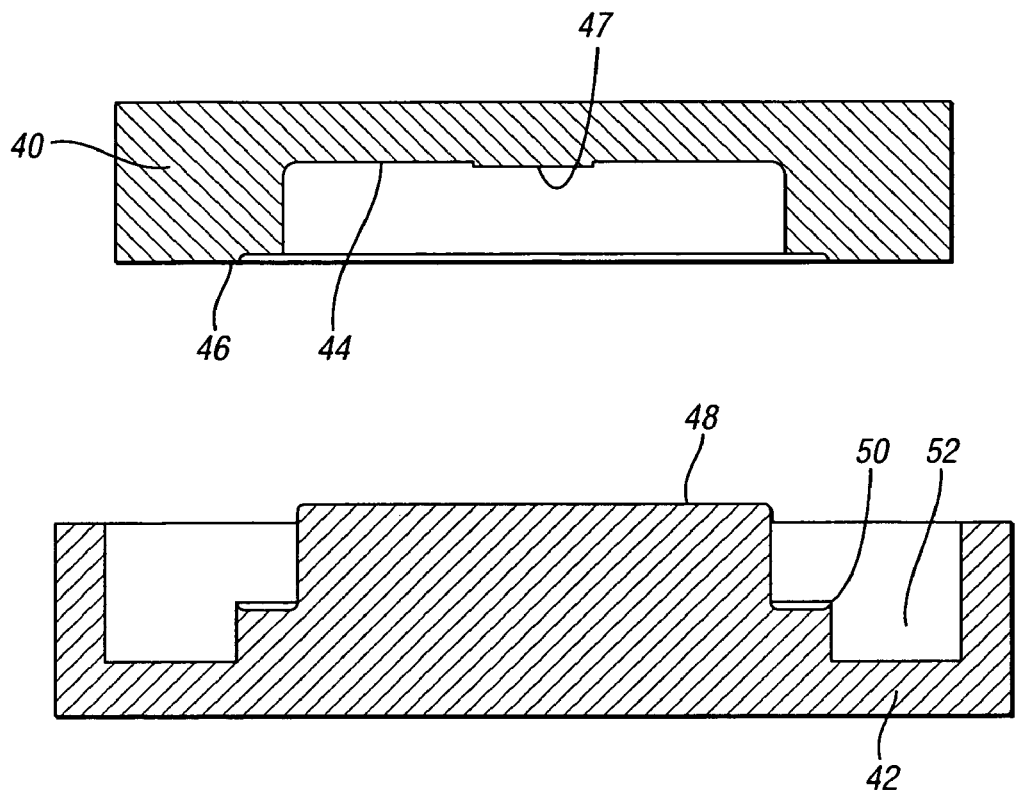
FIG. 4 is a sectional view of upper and lower tools configured to produce the rotor assembly of FIG. 1.

Referring to FIG. 4, a cross-sectional view of an upper tool 40 and a lower tool 42 configured to manufacture the brake rotor assembly 10 is shown. The upper tool 40 includes a tool surface 44 configured to produce the top surface 38a of the hub section 14 (shown in FIG. 3). The upper tool 40 also includes an upper sealing lip 46 configured to define the terminal edge 33a of the top portion 32a of the hub flange 30 (shown in FIG. 3). According to a preferred embodiment, the upper tool 40 includes a generally cylindrical protrusion 47 configured to produce the central aperture 26 (shown in FIG. 1); however it should be appreciated that the central aperture 26 may alternatively be produced by a subsequent machining process. The bolt holes 28 (shown in FIG. 1) may similarly be produced by a plurality of smaller protrusions (not shown) or by a subsequent machining process.

The lower tool 42 includes a tool surface 48 configured to produce the bottom surface 38b of the hub section 14 (shown in FIG. 3). The lower tool 42 also includes a lower sealing lip 50 configured to define the terminal edge 33b of the bottom portion 32b of the hub flange 30 (shown in FIG. 3). The lower tool 42 defines a rotor cavity 52 configured to accommodate a rotor such as the vented rotor 12.

Figure 5:
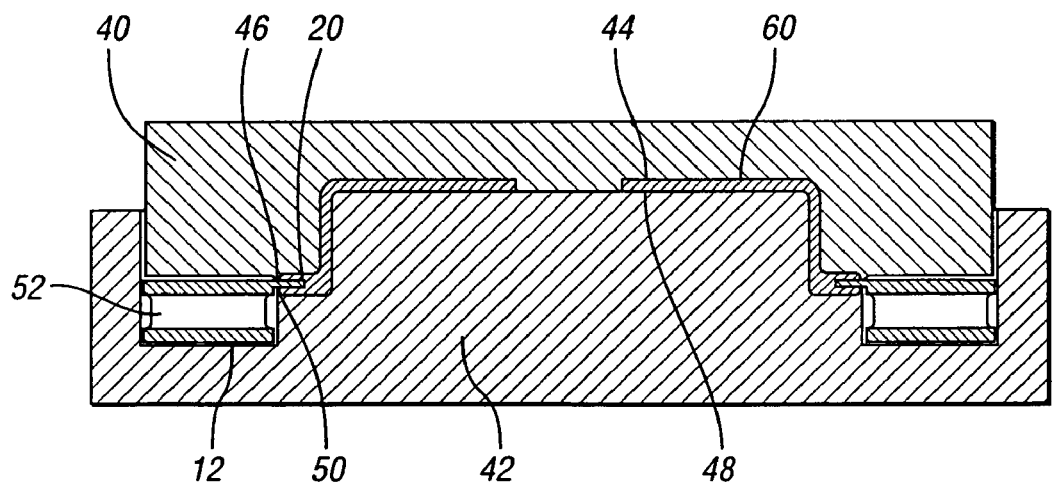
FIG. 5 is a sectional view of the upper and lower tools of FIG. 4 in the closed position.

Referring to FIG. 5, a cross-sectional view of the upper tool 40 engaged with the lower tool 42 is shown. A rotor such as the vented rotor 12 is placed into the rotor cavity 52 of the lower tool 42 before the upper and lower tools 40, 42 are engaged. A portion of the rotor flange 20 is trapped between the sealing lip 46 of the upper tool 40 and the sealing lip 50 of the lower tool 42. The sealing lips 46, 50 define a radially outer perimeter of a cavity 60 formed between the tool surface 44 of the upper tool 40 and the tool surface 48 of the lower tool 42 when the upper and lower tools 40, 42 are engaged.

Having described the tooling and the apparatus of the present invention, the preferred method for manufacturing the brake rotor assembly 10 will hereinafter be described. The method of the present invention is preferably initiated by placing a rotor such as the vented rotor 12 into the rotor cavity 52 of the lower tool 42. The upper tool 40 and the lower tool 42 are then engaged to form the cavity 60. A compressive force is then preferably applied to draw the upper and lower tools 40, 42 together and thereby clamp the rotor flange 20 between the sealing lips 46, 50 such that material introduced into the cavity 60 does not leak out. The upper and lower tools 40, 42, and the vented rotor 12 are maintained at a predetermined elevated temperature such that molten material introduced into the cavity 60 does not prematurely cool upon contact with a relatively cold surface. Molten material such as aluminum or magnesium is then injected into the cavity 60 to form the hub section 14 which is cast onto the vented rotor 12 thereby producing the rotor assembly 10 (shown in FIG. 1). The introduction of molten material into the cavity 60 in the manner described forms the hub teeth 34 (shown in FIGS. 1 and 3) which mechanically interlock with the rotor teeth 24 (shown in FIG. 2) to prevent rotation of the hub section 14 relative to the rotor 12. Additionally, as the molten material comes into contact with the vented rotor 12, a welding or diffusion bonding process preferably takes place at the interface between the hub section 14 and the rotor 12 to further prevent relative rotation therebetween. After allowing the rotor assembly 10 to cool, the upper and lower tools 40, 42 are separated and the rotor assembly 10 is removed.

While the preferred method was described hereinabove, it should be appreciated that alternate and/or additional steps may be implemented as well. For example, instead of injecting molten material into the cavity 60, a semi-solid material may be introduced into the cavity 60 in accordance with the well known semi-solid forging process. Additionally, after the rotor assembly 10 is removed from the lower tool 42, it may be necessary to perform processing steps such as, for example, machining the bolt holes 28 (shown in FIG. 1).

While the best modes for carrying out the invention have been described in detail, those familiar with the art to which this invention relates will recognize various alternative designs and embodiments for practicing the invention within the scope of the appended claims.

The invention claimed is:

1. A method for producing a rotor assembly for a vehicle brake system comprising:
   providing an upper tool having an upper sealing lip, and a lower tool having a lower sealing lip;
   disposing a rotor having a radially internal flange within said lower tool;
   engaging the upper and lower tools such that a cavity is formed therebetween;
   heating the upper tool, the lower tool and the rotor;
   applying a compressive force to draw the upper and lower tools together and thereby clamp the rotor flange between the upper sealing lip and the lower sealing lip;
   transferring material into the cavity formed between the upper and lower tools such that a hub section is formed onto the rotor, and wherein the upper sealing lip and lower sealing lip are constructed and arranged to produce radially extending upper and lower portions of a radially extending flange of the hub to capture the radial internal flange of the rotor and wherein the plurality of rotor teeth are in the same plane as a frictional surface of the rotor.

2. The method of claim 1, wherein said transferring material into the cavity includes injecting molten aluminum into the cavity.

3. The method of claim 1, wherein said transferring material into the cavity includes injecting molten magnesium into the cavity.

4. The method of claim 1, wherein said transferring material into the cavity includes transferring semi-solid aluminum into the cavity.

5. The method of claim 1, further comprising machining a plurality of bolt holes into the hub section.

6. The method of claim 1, wherein the rotor comprise a frictional surface; wherein the radially internal flange comprises a plurality of rotor teeth; wherein the hub section formed comprises a hub flange configured to engage the plurality of rotor teeth to prevent rotation of the hub section relative to the rotor.

7. The method of claim 6, wherein the hub flange is generally annular.

8. The method of claim 6, wherein the hub flange comprises the radially extending opposing top and bottom portions and wherein the hub flange further comprises a plurality of hub teeth disposed between the top and bottom portions of the hub flange.

9. The method of claim 6, wherein the radially extending top and bottom portions are generally parallel and wherein each portion defines radially outer terminal edges.

10. The method of claim 1, wherein the rotor is one material and comprises opposing first and second cheeks that are connected together.

11. The method of claim 9, wherein the terminal edges are generally parallel to each other.

12. A method for producing a rotor assembly for a vehicle brake system comprising:

provinding an upper tool having an upper sealing lip, and a lower tool having a lower sealing lip;

disposing a rotor having a radially internal flange within said lower tool;

engaging the upper and lower tools such that a cavity is formed therebetween;

heating the upper tool, the lower tool and the rotor;

applying a compressive force to draw the upper and lower tools together and thereby clamp the rotor flange between the upper sealing lip and the lower sealing lip; and transferring material into the cavity formed between the upper and lower tools such that a hub section is formed onto the rotor;

wherein the rotor comprise a frictional surface; wherein the radially internal flange comprises a plurality of rotor teeth; wherein the hub section formed comprises a hub flange configured to engage the plurality of rotor teeth to prevent rotation of the hub section relative to the rotor;

wherein the plurality of rotor teeth are in the same plane as a frictional surface of the rotor.

* * * * *